(12) United States Patent
Gao (10) Patent No.: US 11,917,229 B2
(45) Date of Patent: Feb. 27, 2024

(54) CONTROL METHOD, SYSTEM, DEVICE, AND MEDIUM OF UNIFIED PLAYBACK CONTROL SYSTEM

(71) Applicant: ZTE Corporation, Shenzhen (CN)

(72) Inventor: Zhenzhu Gao, Shenzhen (CN)

(73) Assignee: XI'AN ZHONGXING NEW SOFTWARE CO., LTD., Shaanxi (CN)

( * ) Notice: Subject to any disclaimer, the term of this patent is extended or adjusted under 35 U.S.C. 154(b) by 0 days.

(21) Appl. No.: 17/762,803

(22) PCT Filed: Sep. 11, 2020

(86) PCT No.: PCT/CN2020/114856
§ 371 (c)(1),
(2) Date: Mar. 23, 2022

(87) PCT Pub. No.: WO2021/057516
PCT Pub. Date: Apr. 1, 2021

(65) Prior Publication Data
US 2022/0360834 A1 Nov. 10, 2022

(30) Foreign Application Priority Data
Sep. 24, 2019 (CN) .......................... 201910907747.8

(51) Int. Cl.
*H04N 21/21* (2011.01)
*H04N 21/258* (2011.01)
(Continued)

(52) U.S. Cl.
CPC ... *H04N 21/25816* (2013.01); *H04N 21/2393* (2013.01); *H04N 21/8586* (2013.01)

(58) Field of Classification Search
None
See application file for complete search history.

(56) References Cited

U.S. PATENT DOCUMENTS

| | | | |
|---|---|---|---|
| 2005/0204387 A1* | 9/2005 | Knudson | H04N 21/6547 348/E7.071 |
| 2009/0183217 A1* | 7/2009 | Mukerji | H04N 21/4825 725/110 |

(Continued)

FOREIGN PATENT DOCUMENTS

| | | |
|---|---|---|
| CA | 2733038 A1 | 8/2012 |
| CN | 101193256 A | 6/2008 |

(Continued)

OTHER PUBLICATIONS

International Search Report for corresponding application PCT/CN2020/114856 filed on Sep. 11, 2020; dated Nov. 27, 2020.
(Continued)

*Primary Examiner* — Cai Y Chen
(74) *Attorney, Agent, or Firm* — CANTOR COLBURN LLP (57) ABSTRACT

The embodiments of the present disclosure provide a control method, system, device, and medium of a unified playback control system. The control method of the unified playback control system includes: receiving a template request sent by a device, then, after receiving the template request, returning a preset template to the requesting device, and managing and controlling playback of the device by means of the template. In some implementations, the device obtains a unified template of the unified playback control system, and management and control is performed by means of the preset template so as to enable a licensee EPG platform on the device to present a consistent interface style and unified management and control process.

20 Claims, 6 Drawing Sheets

(51) Int. Cl.
*H04N 21/239* (2011.01)
*H04N 21/858* (2011.01)

(56) References Cited

U.S. PATENT DOCUMENTS

| | | |
|---|---|---|
| 2013/0298155 A1 | 11/2013 | Stepanov |
| 2015/0121484 A1 | 4/2015 | Liu |
| 2015/0150038 A1* | 5/2015 | Hao .................. H04N 21/8455 725/31 |

FOREIGN PATENT DOCUMENTS

| | | | |
|---|---|---|---|
| CN | 101600086 A | 12/2009 |
| CN | 101668110 A | 3/2010 |
| CN | 101783906 A | 7/2010 |
| CN | 101883227 A | 11/2010 |
| CN | 101998167 A | 3/2011 |
| CN | 102026036 A | 4/2011 |
| CN | 103282585 A | 9/2013 |
| CN | 103313107 A | 9/2013 |

OTHER PUBLICATIONS

European Search Report for corresponding application EP20867780; dated Nov. 3, 2022.

* cited by examiner

CONTROL METHOD, SYSTEM, DEVICE, AND MEDIUM OF UNIFIED PLAYBACK CONTROL SYSTEM

CROSS REFERENCE

This application is a National Stage Filing of the PCT International Application No. PCT/CN2020/114856 filed on Sep. 11, 2020, which claims priority to Chinese Application No. 201910907747.8 filed on Sep. 24, 2019, the entirety of which is herein incorporated by reference.

TECHNICAL FIELD

Embodiments of the present disclosure relate, but are not limited, to the field of video playback control, and specifically relate, but are not limited, to a control method, system, device, and medium of a unified playback control system.

BACKGROUND

With the successful application of high-definition video, ultra-high-definition video, 4K or even 8K video in an Internet Protocol Television (IPTV)/Over The Top (OTT, referring to various application services provided for users through Internet), the era of big video is coming. In recent years, IPTV/OTT is developed rapidly, and the market is huge, so that various device licensees compete to enter the field of IPTV/OTT videos. In addition, to ensure competition among device licensees and enlarge the market, operators introduce devices of a plurality of licensees when establishing an IPTV/OTT video playback platform, and divide a video playback system into a plurality of Electronic Program Guide (EPG) platforms and management platforms, which are constructed by different licensees.

Although this can make the market bigger and bigger, increase the competition among the various device licensees, and provide the operators with more choices, it also brings some problems. For example, there are differences between the EPG platforms constructed by different licensees, and designs are different for interfaces of the EPG platforms, so that a unified style experience cannot be provided for users. It is hard for the operators to perform unified management and controlling due to voluntary EPG platform establishment of the licensees, resulting in the loss of the interests of the operators.

SUMMARY

Embodiments of the present disclosure provide a control method, system, device, and medium of a unified playback control system, which can mainly solve the technical problems that a playback control system in the related art does not have a unified display style of an EPG platform and does not perform unified management and controlling on the EPG platforms of various licensees.

Some embodiments of the present disclosure provide a control method of a unified playback control system. The control method includes: receiving a template request sent by a device; sending a preset template to the device; and managing and controlling, by the unified playback control system, playback of the device by means of the preset template.

In some exemplary embodiments, the template request includes licensee device information. After receiving the template request sent by the device and before sending the preset template to the device, the control method further includes: verifying the licensee device information to acquire a first verification result; and in a case where the first verification result indicates that the verification is passed, sending the preset template to the device.

In some exemplary embodiments, the operation of managing and controlling, by the unified playback control system, the playback of the device by means of the preset template includes: receiving a first authentication request sent by the device by means of the preset template; acquiring an authentication result according to the first authentication request; in a case where the authentication result indicates that the authentication is passed, splicing, by the unified playback control system, a playback Uniform Resource Locator (URL), and sending, by the unified playback control system, the spliced playback URL to the device; and in a case where the authentication result indicates that the authentication is failed, sending at least one of an authentication failure result or product subscription information to the device.

In some exemplary embodiments, the first authentication request includes provider information and content information. The operation of acquiring the authentication result according to the first authentication request includes: verifying the provider information and the content information to acquire a second verification result; in a case where the second verification result indicates that the verification is failed, determining the authentication result as indicating that the authentication is failed; and in a case where the second verification result indicates that the verification is successful, sending a second authentication request to a management platform, and receiving the authentication result sent by the management platform according to the second authentication request.

Some embodiments of the present disclosure provide a unified playback control system. The unified playback control system includes a data transmission module and a data storage module. The data transmission module is configured to receive or send data. The data storage module stores a preset template. The data transmission module is configured to send the preset template to a device after receiving a template request sent by the device. The unified playback control system is configured to manage and control playback of the device by means of the preset template.

In some exemplary embodiments, the unified playback control system further includes a first verification module. The template request includes licensee device information. After the data transmission module receives the template request sent by the device and before the data transmission module sends the preset template to the device, the first verification module is configured to verify the licensee device information to acquire a first verification result; and in a case where the first verification result indicates that the verification is passed, the data transmission module is configured to send the preset template to the device.

In some exemplary embodiments, the unified playback control system further includes a URL processing module and an authentication module. The playback control system is configured to manage and control the playback of the device by means of the preset template in a following manner.

The data transmission module is configured to receive a first authentication request sent by the device by means of the preset template. The authentication module is configured to acquire an authentication result according to the first authentication request. The URL processing module is invoked, in a case where the authentication result indicates that the authentication is passed, to splice a playback URL and send the spliced playback URL to the device by using the data transmission module. The data transmission module is invoked, in a case where the authentication result indicates that the authentication is failed, at least one of an authentication failure result or product subscription information to the device.

In some exemplary embodiments, the unified playback control system further includes a second verification module. The first authentication request includes provider information and content information. The authentication module is configured to acquire an authentication result according to the first authentication request in a following manner. The second verification module is configured to verify the provider information and the content information to acquire a second verification result, in a case where the second verification result indicates that the verification is failed, set the authentication result as indicating that the authentication is failed, and in a case where the second verification result indicates that the verification is successful, send a second authentication request to a management platform by using the data transmission module. The data transmission module is configured to receive the authentication result sent by the management platform according to the second authentication request.

Some embodiments of the present disclosure provide a computer device. The computer device includes a processor, a memory, and a communication bus. The communication bus is configured to conduct connection communication between the processor and the memory. The processor is configured to perform one or more programs stored in the memory to implement operations of the above control method of a unified playback control system.

Some embodiments of the present disclosure provide a computer-readable storage medium. The computer-readable storage medium stores one or more programs. The one or more programs are executable by one or more processors, so as to implement operations of the above control method of a unified playback control system.

DETAILED DESCRIPTION

To make the objectives, technical solutions and advantages of the present disclosure clearer, the embodiments of the present disclosure are further described in detail below with reference to exemplary implementations and the drawings. It should be understood that the specific embodiments described here are merely used to explain the present disclosure, and are not used to limit the present disclosure.

Embodiment I

Figure 1:
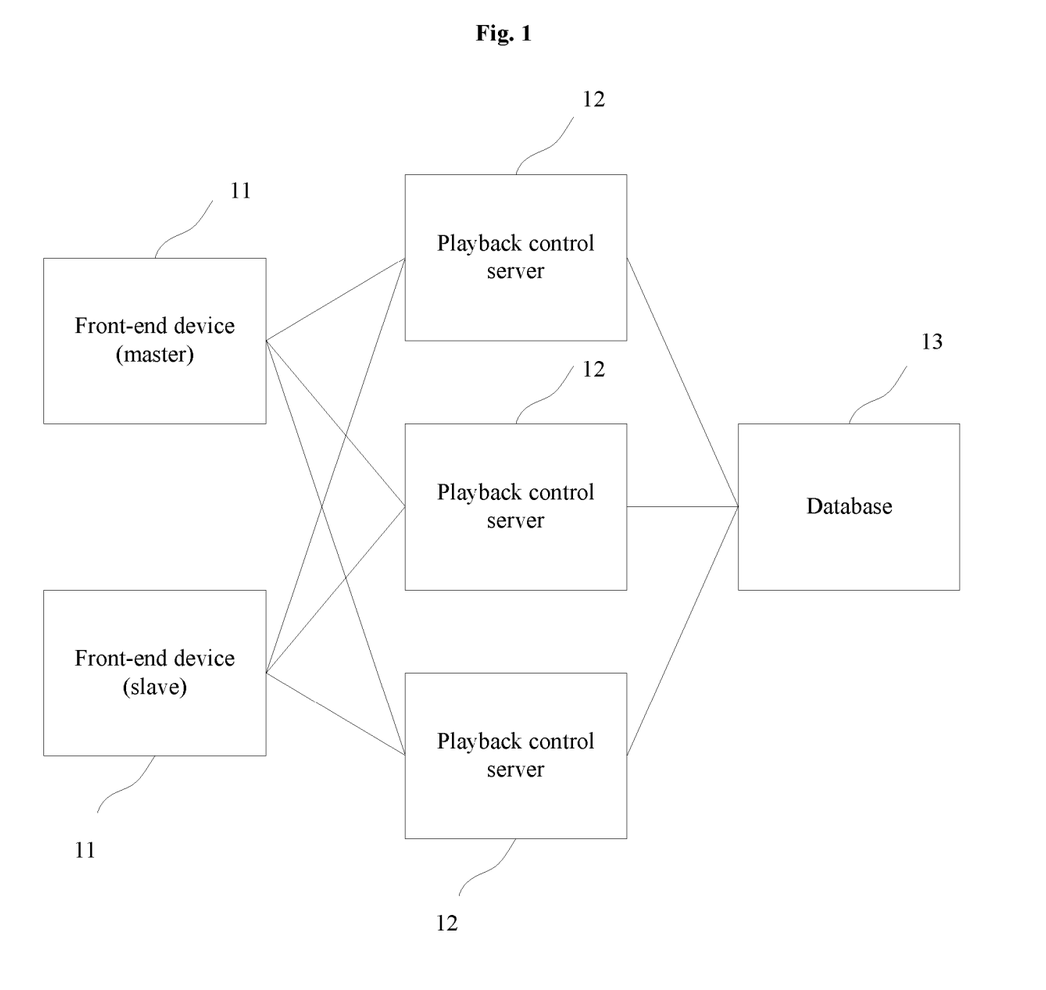
FIG. 1 is a schematic diagram of a networking mode of a unified playback control system according to Embodiment I of the present disclosure.

FIG. 1 is a schematic diagram of a networking mode of a unified playback control system according to Embodiment I of the present disclosure.

Referring to FIG. 1, in an implementation, a unified playback control system performs networking by using the following methods. A front-end device 11, a plurality of playback control servers 12, and a database 13 are used. Two front-end devices 11 are provided to respectively serve as a master and a slave. The front-end device 11 sends a request to each playback control server 12 for processing by means of polling. Each playback control processor is connected to the database 13, so that data stored in the database 13 may be acquired.

It is to be noted that, the schematic networking diagram of the unified playback control system provided in this embodiment is merely an implementation. Without requiring any creative modification, the control method of a unified playback control system provided in the embodiment of the present disclosure can also control the unified playback control system which performs networking in other manners.

Figure 2:
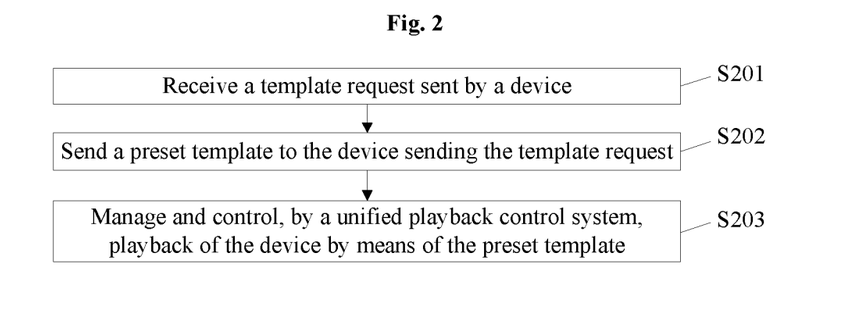
FIG. 2 is a flowchart of a control method of a unified playback control system according to Embodiment I of the present disclosure.

FIG. 2 is a flowchart of a control method of a unified playback control system according to Embodiment I of the present disclosure. Referring to FIG. 2, the control method includes the following operations S201 to S203.

At S201, a template request sent by a device is received.

When a user logs in on the device, a login request is sent to an EPG platform for verification. After the EPG platform successfully verifies the login of the user, the device is redirected to the unified playback control system. In this case, the device sends the template request to the unified playback control system. Taking the networking mode of the unified playback control system shown in FIG. 1 as an example, in this networking mode, the template request is received by the front-end device and is transmitted to one of the playback control servers for processing by means of polling.

At S202, a preset template is sent to the device that sends the template request.

In response to the received template request, the preset template stored in the unified playback control system is sent to the device. The device loads the preset template after receiving the preset template.

In some exemplary embodiments, in order to guarantee the safety of the unified playback control system, licensee device information is added in the template request. The licensee device information can indicate a requesting licensee and related attributes of the device. After the template request sent by the device is received, and before the preset template is sent to the device, primary verification is performed on the licensee device information.

As an exemplary implementation, the licensee device information may be a combination of a licensee identifier and a device identifier or information formed by encrypting the combination of the licensee identifier and the device identifier. It is to be understood that, if the licensee device information is the encrypted information, the licensee device information shall be decrypted before verification. The verification on the licensee device information may be conducted by using a black and white list. Whether a licensee and the device are legal can be learned by matching the licensee identifier and the device identifier with information in the list. Related verification conditions may also be designed to determine that the licensee and the device meeting the conditions are legal. Alternatively, other verification method may be used.

After the licensee device information passes the verification, the preset template is sent to the device sending the template request. In this way, unknown and illegal requests can be excluded to ensure the security of the system.

According to the above technical solutions provided in the embodiments of the present disclosure, by receiving the template request sent by the device, and after the template request is received, the preset template is returned to the requesting device, and playback of the device is managed and controlled by means of the preset template. In this embodiment of the present disclosure, the preset template is sent to the device, and the device invokes the preset template after receiving the preset template. Since the template is designed in advance, the unity of display styles can be guaranteed even if an operator introduces a plurality of licensee EPG platforms during certain implementations, and the unified playback control system can achieve unified management and controlling through control operations of the preset template.

Figure 3:
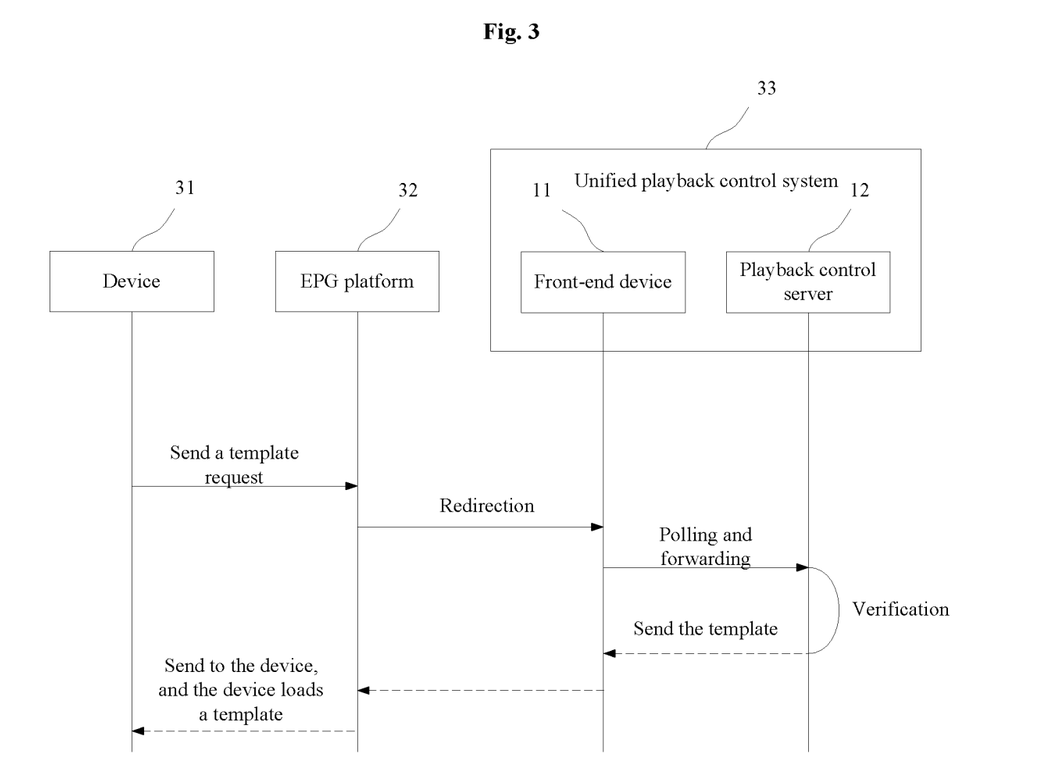
FIG. 3 is a schematic diagram of an overall process of requesting a template by a device according to Embodiment I of the present disclosure.

FIG. 3 is a schematic diagram of an overall process of requesting a template by a device according to this embodiment. Referring to FIG. 3, the user sends the template request to the EPG platform 32 after logging in the EPG platform 32 by using the device 31. The EPG platform 32 redirects the template request sent by the device 31 to the unified playback control system. The front-end device 11 of the unified playback control system forwards the template request to a certain playback control server 12 for processing by means of polling after receiving the template request. The playback control server 12 receiving the template request processes the template request, and verifies the licensee device information of the device 31 carried in the template request by using the above verification method. If verification is passed, the preset template is returned to the EPG platform 32. The EPG sends the received preset template to the device 31. The device 31 loads the received preset template. The above process completes the operation of sending the preset template to the device 31 by using the control method of a unified playback control system provided in this embodiment. Next, the unified playback control system may manage and control playback of the device 31 by means of the preset template.

It is to be noted that, the preset template not only presets a display style of an interface, but also includes some agreed rules. When the device uses the preset template, the operations of the device also follow the rules in the preset template.

At S203, the unified playback control system manages and controls playback of the device by means of the preset template.

In the preset template, relevant operations are agreed in advance. After the device receives and loads the preset template, the implementation of the corresponding playback control and other operations follows specifications agreed in the preset template. Therefore, the unified playback control system can manage and control playback of the device by means of the preset template. For example, in this embodiment, the preset template sends an authentication request to the unified playback control system.

In some exemplary embodiments, a first authentication request sent by the device by means of the preset template is received. Generally, the authentication request needs to be sent when the user requests content. When an authentication result indicates that the authentication is passed, corresponding playback URL is spliced in a unified playback control platform, and the spliced playback URL is sent to the device. If the authentication result indicates that the authentication is failed which may be resulted from the fact that the user has not subscribed to the content or there is an error, at least one of an authentication failure result or product subscription information is sent to the device. In the related art, authentication and acquisition of playback URLs are separated function interfaces, and the EPG platform can directly play for the user by bypassing authentication. During certain implementations, functions of authentication and playback URLs may be integrated into one interface by using the above control method of a unified playback control system, and the playback URL sent by the unified playback control system can be acquired only by sending the authentication request by means of the preset template. Therefore, direct playback of the EPG platform by bypassing authentication or using external authentication can be prevented, and the interests of the operator can be protected.

In some exemplary embodiments, the first authentication request includes certain information required for verification, such as provider information and content information. By verifying the above information, if verification is failed, the authentication result is directly determined as authentication failure. If the verification is passed, a second authentication request is sent to a management platform, and the authentication result returned by the management platform is received.

As an exemplary implementation, the provider information and the content information may be matched and verified by using a black and white list in the same way as the above verification of the licensee device information.

In an exemplary implementation, since the provider information and the content information are large in amount and relatively dispersed, providers and contents in different EPG platforms may be different. Therefore, the provider information and the content information of each platform may be synchronized to the unified playback control system. In this way, during verification, the data stored in the system may be directly invoked for verification. In addition, in the follow-up maintenance, it is only necessary to update the data by acquiring the latest provider and content-related information of each platform and synchronize the latest provider and content-related information to the unified playback control system. When the networking mode shown in FIG. 1 is used, related data may be stored in the database.

Figure 4:
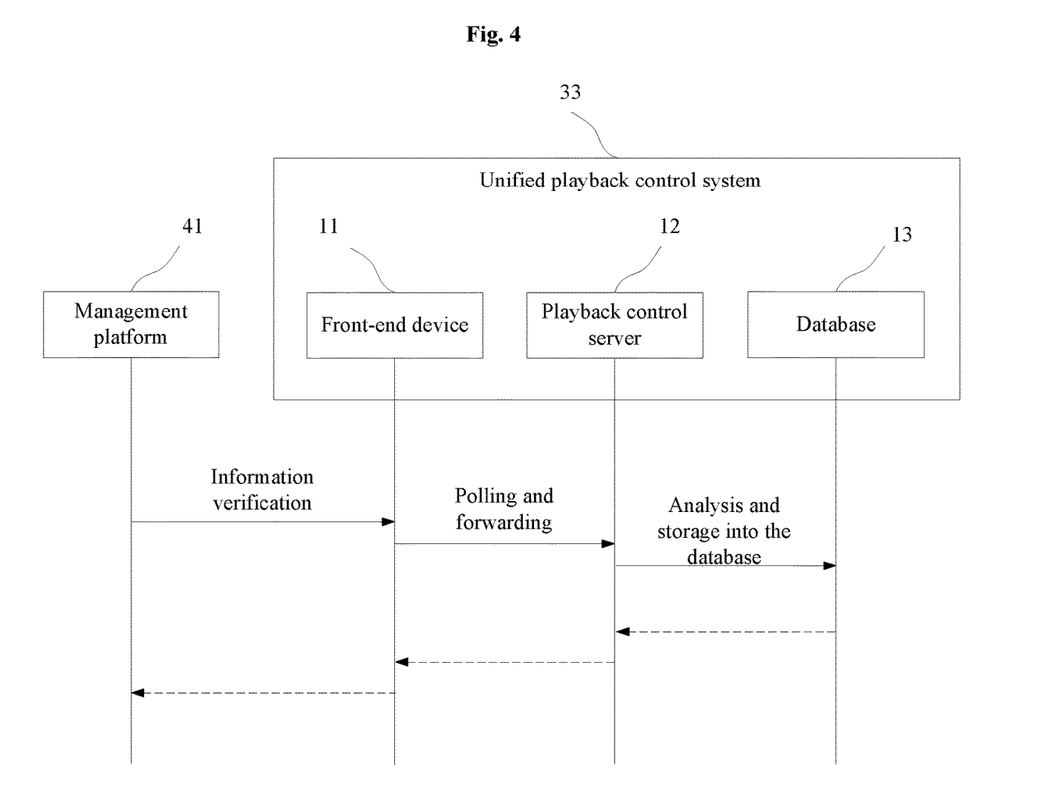
FIG. 4 is a schematic diagram of an overall process of synchronizing verification information to a unified playback control system from a management platform according to Embodiment I of the present disclosure.

FIG. 4 is a schematic diagram of an overall process of synchronizing verification information to a unified playback control system from a management platform according to this embodiment. Referring to FIG. 4, a management platform 41 sends verification information to the front-end device 11. After receiving the verification information, the front-end device 11 sends the verification information to one of the playback control servers 12 by means of polling. The playback control servers 12 stores the verification information into the database 13 after processing. Definitely, other information of the management platform 41, such as playback URL, may also be sent to the unified playback control system in this way.

Further, on the basis of the above exemplary implementation, the unified playback control system may also have its own verification information. During actual application, if there is illegal content or illegal content providers, and when the EPG platform cannot perform off-shelf treatment in time for processing, the unified playback system may use its own verification information to intercept the illegal contents or requests of the providers, so that the verification cannot be passed. In this way, the centralized control of the illegal contents of each platform and the control effect of rapid offline can be achieved.

After the authentication is failed, the content sent by the device may further be selected according to actual conditions. For example, under a case that the provider information and the content information are required to be verified, if the providers and the content are illegal, the corresponding authentication failure result information can be sent directly. If the verification is passed, but the user has not subscribed to the content to cause the management platform to return an authentication failure result, the product subscription information may be sent or the authentication failure result and the product subscription information are sent together.

It is to be further noted that, the authentication result returned by the management platform is a final authentication result, which is an authentication result for the first authentication request and the second authentication request. In this embodiment, the first authentication request and the second authentication request are different. Since the unified playback control system verifies the provider information and the content information, the second authentication request may not include corresponding verification information. However, in other implementations, the first authentication request and the second authentication request may be the same. After verification, the unified playback control system directly forwards an original first authentication request to form the second authentication request. The management platform may perform secondary verification on the information required to be verified to ensure that the contents conform to the specifications.

Figure 5:
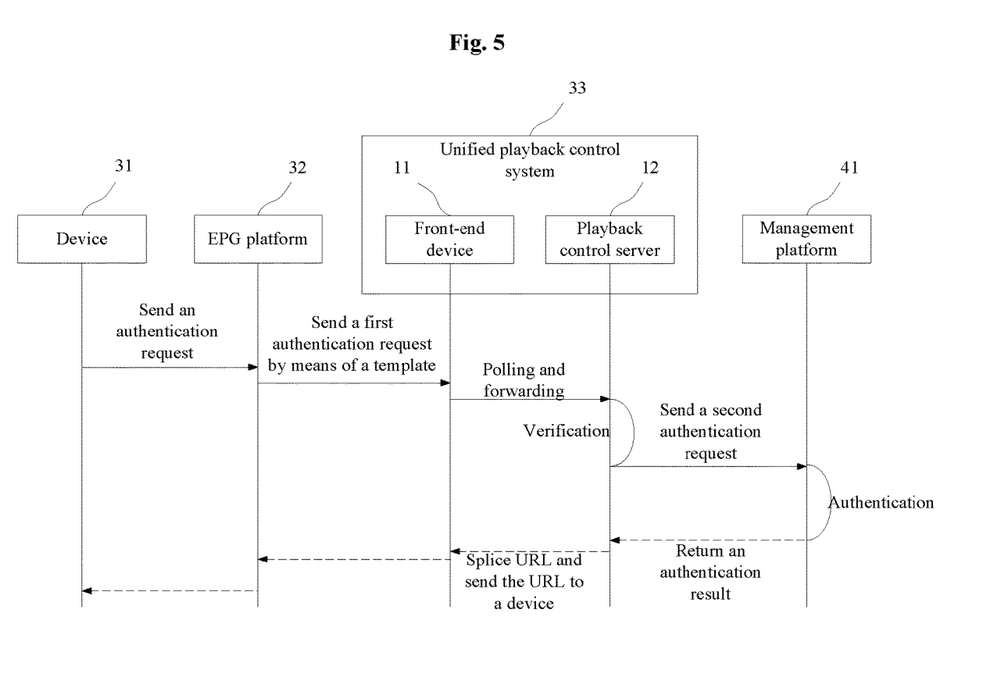
FIG. 5 is a schematic diagram of an overall process of sending an authentication request by a device according to Embodiment I of the present disclosure.

FIG. 5 is a schematic diagram of an overall process of sending an authentication request by a device according to this embodiment. Referring to FIG. 5, when the user is requesting for on-demand contents, the device 31 sends the authentication request to the EPG platform 32. The EPG platform 32 invokes a unified template, and sends the first authentication request to the unified playback control system by means of the unified template. After receiving the first authentication request, the front-end device 11 of the unified playback control system sends the first authentication request to the playback control server 12 for processing. In the playback control server 12, the content provider information and the content information carried in the first authentication request are verified. If the verification is passed, the second authentication request is sent to the management platform 41. The management platform 41 processes the second authentication request and returns the authentication result back to the playback control server 12. If the authentication is passed, the playback control server 12 splices the playback URL and finally sends the playback URL to the device 31.

According to the control method of a unified playback control system provided in the embodiments of the present disclosure, the template request sent by the device is received, the preset template is sent to the device after the template request is received, and playback of the device is managed and controlled by means of the preset template. Through the preset template with a unified style and control specifications, different licensee EPG platforms can be guaranteed to present a consistent display style to the user, and can be managed and controlled by the unified playback control system through the operations of the preset template.

Embodiment II

In Embodiment II of the present disclosure, an exemplary implementation of the embodiments of the present disclosure is described with more detailed scenarios. It is to be understood that, execution operations of this embodiment merely realize an exemplary implementation of a solution of the embodiment of the present disclosure, and should not be considered as the only implementation of the solution of the embodiment of the present disclosure.

Figure 6:
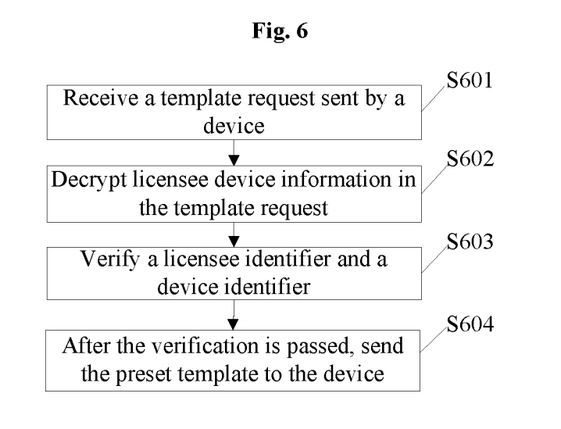
FIG. 6 is a detailed flowchart of a control method of a unified playback control system according to Embodiment II of the present disclosure.

FIG. 6 is a detailed flowchart of a control method of a unified playback control system according to Embodiment II of the present disclosure. Referring to FIG. 6, a detailed process shown in FIG. 6 is mainly an exemplary process of performing verification before sending the template request in this embodiment.

At S601, a template request sent by a device is received.

At S602, licensee device information in the template request is decrypted.

In this embodiment, the licensee device information is formed by encrypting a combination of a licensee identifier and a device identifier. The device identifier is Media Access Control (MAC) address information. After the template request is received, the licensee device information is decrypted. The licensee identifier and the device identifier are obtained after decryption.

At S603, the licensee identifier and the device identifier are verified.

In this embodiment, the licensee identifier and the device identifier are verified based on a black and white list. Specifically, the licensee identifier and the device identifier are obtained after decryption, there are licensee black and white lists and device black and white lists, and the licensee identifier and the device identifier are matched and verified based on respective black and white lists to obtain a result that whether the licensee and the device are legal.

At S604, after the verification is passed, the preset template is sent to the device.

If the licensee and the device are legal, the verification is passed, and the preset template is sent to the device.

Figure 7:
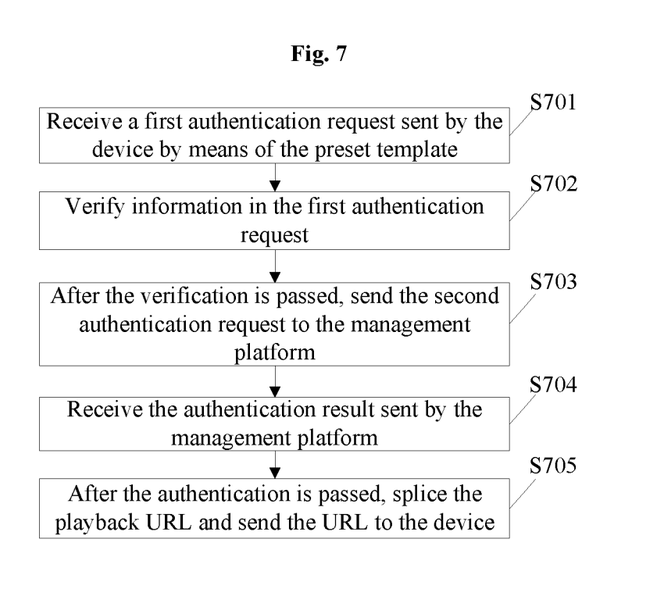
FIG. 7 is a detailed flowchart of a control method of a unified playback control system according to Embodiment II of the present disclosure.

FIG. 7 is a detailed flowchart of a control method of a unified playback control system according to Embodiment II of the present disclosure. Referring to FIG. 7, a detailed process shown in FIG. 7 is mainly an exemplary process of managing and controlling playback of the device by means of the template in this embodiment.

At S701, a first authentication request sent by a device by means of a preset template is received.

The user requests for on-demand content, and the related first authentication request is sent by means of the preset template.

At S702, information in the first authentication request is verified.

The first authentication request carries the content provider information and the content information. The unified playback control system also stores corresponding verification information A mode that the unified playback control system acquires the verification information may be a mode shown in FIG. 4 in Embodiment I, or may be other modes, which are not described herein in detail.

The content provider information and the content information are verified according to the corresponding verification information to ensure that the providers and the content are legal and compliant.

At S703, after the verification is passed, a second authentication request is sent to the management platform.

If the providers and the content are legal and compliant, the verification is passed, and then the second authentication request is sent to the management platform. In this embodiment, the second authentication request is different from the first authentication request in that the second authentication request only carries the content information.

If the verification is failed, it indicates that the content is illegal content or the providers may be illegal, so that authentication failure information may be directly returned to the device.

At S704, an authentication result sent by the management platform is received.

After receiving the second authentication request, the management platform can determine whether the user has subscribed to the content according to the carried content information.

The unified playback control system receives the authentication result returned by the management platform. The authentication result is a final authentication result.

At S705, after the authentication is passed, the playback URL is spliced and sent to the device.

If the received authentication result indicates that the authentication is passed, the unified playback control system splices the playback URL corresponding to the content, and returns the spliced playback URL to the device. The device may play the content after receiving the URL.

If the authentication result indicates that the authentication is failed, it indicates that the user has not subscribed to the content, the product subscription information may be returned to the device for the user to subscribe to the content.

In this embodiment, the template request sent by the device is received, the preset template is sent to the device after template request information is verified, the authentication request of the device is received by means of the preset template, and the URL is returned to the device after the authentication is passed. In this way, playback of the device can be managed and controlled by means of the preset template. Therefore, the standardization of the unified playback control system is improved, so that the style of a device playback interface is consistent. The playback process is more standardized, and the device can be managed and controlled uniformly.

Embodiment III

Figure 8:
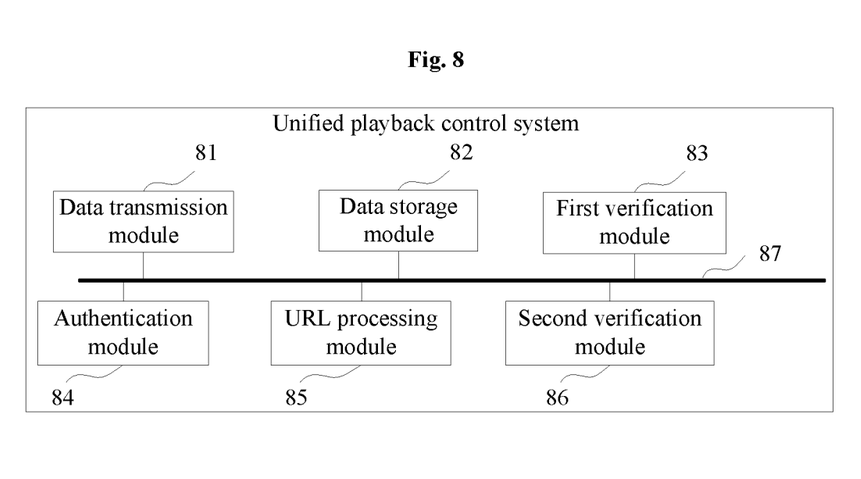
FIG. 8 is a schematic structural diagram of a unified playback control system according to Embodiment III of the present disclosure.

FIG. 8 is a schematic structural diagram of a unified playback control system according to Embodiment III of the present disclosure. Referring to FIG. 8, the unified playback control system includes a data transmission module 81, a data storage module 82, a first verification module 83, an authentication module 84, a URL processing module 85, and a second verification module 86. The modules are connected to each other by using a communication bus 87. After the data transmission module 81 receives a template request sent by a device, the first verification module 83 verifies information in the template request. After verification is passed, a preset template stored in the data storage module 82 is sent to the device, so that a unified playback control system can manage and control playback of the device by means of the preset template.

The operation that the unified playback control system manages and controls playback of the device by means of the preset template includes the following operations. The authentication module 84 is configured to acquire an authentication result according to a first authentication request sent from the preset template received by the data transmission module 81. The URL processing module 85 is configured to splice a playback URL after the authentication result indicates that authentication is succeeded, and send the spliced playback URL to the device by using the data transmission module 81. The second verification module 86 is configured to verify information in the first authentication request. If verification is failed, the authentication module 84 is configured to set the authentication result as indicating that the authentication is failed. If the verification is passed, a second authentication request is sent to a management platform by using the data transmission module 81, and the authentication result sent by the management platform is received. Exemplary implementation operations of functions of the above modules have been described in Embodiment I or Embodiment II, which are not described herein again.

The unified playback control system provided in this embodiment of the present disclosure can manage and control playback of the device by means of the preset template, which ensures the consistent style of a playback interface of the device and realizes the unified management and control of the playback. Therefore, the standardization and the security of video playback can be improved.

Embodiment IV

Figure 9:
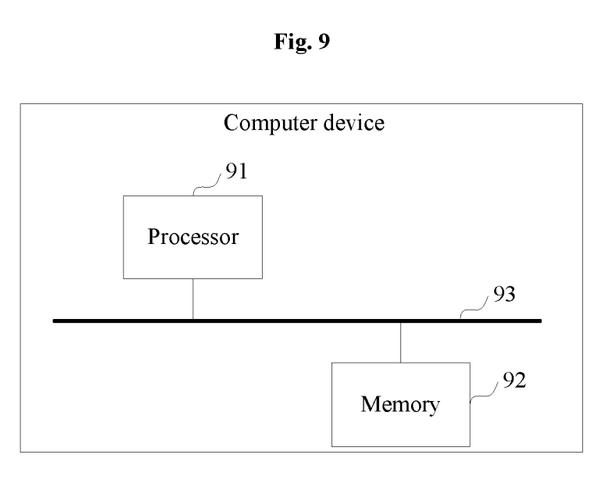
FIG. 9 is a schematic structural diagram of a computer device according to Embodiment IV of the present disclosure.

This embodiment provides a computer device. Referring to FIG. 9, the computer device includes a processor 91, a memory 92, and a communication bus 93.

The communication bus 93 is configured to conduct connection communication between the processor 91 and the memory 92.

The processor 91 is configured to perform one or more computer programs stored in the memory 92 to implement at least one operation of the control method of a unified playback control system in Embodiment I or Embodiment II.

This embodiment provides a computer-readable storage medium. The computer-readable storage medium includes volatile or non-volatile, removable or non-removable media implemented in any methods or technologies for storing information (such as computer readable instructions, data structures, computer program modules, or other data). The computer-readable storage medium includes, but is not limited to, a Random Access Memory (RAM), a Read-Only Memory (ROM), an Electrically Erasable Programmable Read Only Memory (EEPROM), a flash memory or other memory technology, Compact Disc Read-Only Memory (CD-ROM), Digital Versatile Disc (DVD) or other optical disk storage, a disk box, a magnetic tape, a disk storage or other magnetic storage apparatuses, or any other medium that can be used to store desired information and that may be accessed by a computer.

The computer-readable storage medium in this embodiment may be configured to store one or more computer programs. The one or more computer programs stored therein may be executed by a processor, so as to implement at least one operation of the control method of a unified playback control system in Embodiment I or Embodiment II.

It is to be seen that, those having ordinary skill in the art should understand that all or some of the operations in the method disclosed above, functional modules/units in the system and the apparatus can be implemented as software (which may be implemented by computer program codes executable by a computing apparatus), firmware, hardware, and a combination thereof. In the implementation of the hardware, the division between the functional modules/units described above does not necessarily correspond to the division of physical components. For example, a physical component may have a plurality of functions, or a function or operation may be performed cooperatively by a plurality of physical components. Some or all of physical components may be implemented as software executed by a processor, such as a central processing unit, a digital signal processor or a microprocessor, or as hardware, or as an integrated circuit, such as an application specific integrated circuit.

In addition, communication media typically includes computer readable instructions, data structures, computer program modules, or other data in a modulated data signal such as a carrier wave or other transport mechanism, and may include any information delivery media, as is well known to those of ordinary skill in the art. In this way, the present disclosure is not limited to any specific combination of hardware and software.

The above content is a further detailed description of the embodiments of the present disclosure with reference to exemplary implementations, and it cannot be considered that the exemplary implementation of the present disclosure is limited to these descriptions. For those of ordinary skill in the technical field of the present disclosure, without departing from the concept of the present disclosure, some simple deductions or substitutions can be made, which may be regarded as belonging to the protection scope of the present disclosure.

What is claimed is:

1. A control method of a unified playback control system, comprising:
   receiving, by a unified playback control system, a template request redirected to the unified playback control system by each EPG platform among different EPG platforms after the EPG platform receives the template request sent by a device after the device logs in the EPG platform, wherein the device is a device on which a user logs in;
   sending, by the unified playback control system, a preset template to the device, wherein the preset template presets a unified display style of an interface for the different EPG platforms and comprises agreed rules that a device loading the preset template follows when performing operations; and
   managing and controlling, by the unified playback control system, playback of the device by means of the preset template.

2. The control method of a unified playback control system according to claim 1, wherein the template request comprises licensee device information; and
   after receiving the template request sent by the device and before sending the preset template to the device, the control method further comprises:
   verifying the licensee device information to acquire a first verification result; and
   in a case where the first verification result indicates that the verification is passed, sending the preset template to the device.

3. The control method of a unified playback control system according to claim 1, wherein managing and controlling, by the unified playback control system, the playback of the device by means of the preset template comprises:
   receiving a first authentication request sent by the device by means of the preset template;
   acquiring an authentication result according to the first authentication request;
   in a case where the authentication result indicates that the authentication is passed, splicing, by the unified playback control system, a playback Uniform Resource Locator (URL), and sending, by the unified playback control system, the spliced playback URL to the device; and
   in a case where the authentication result indicates that the authentication is failed, sending at least one of an authentication failure result or product subscription information to the device.

4. The control method of a unified playback control system according to claim 3, wherein the first authentication request comprises provider information and content information; and
   acquiring the authentication result according to the first authentication request comprises:
   verifying the provider information and the content information to acquire a second verification result;
   in a case where the second verification result indicates that the verification is failed, determining the authentication result as indicating that the authentication is failed; and
   in a case where the second verification result indicates that the verification is successful, sending a second authentication request to a management platform, and receiving the authentication result sent by the management platform according to the second authentication request.

5. A unified playback control system, comprising a memory storing instructions and a preset template and a processor in communication with the memory, wherein the processor is configured to execute the instructions to:
   receive or send data; and
   send the preset template to a device after receiving a template request redirected to the unified playback control system by each EPG platform among different EPG platforms after the EPG platform receives the template request sent by the device after the device logs in the EPG platform, wherein the device is a device on which a user logs in, and the preset template presets a unified display style of an interface for the different EPG platforms and comprises agreed rules that a device loading the preset template follows when performing operations; and
   manage and control playback of the device by means of the preset template.

6. The unified playback control system according to claim 5, wherein the template request comprises licensee device information;
   after the data transmission module receives the template request sent by the device and before the data transmission module sends the preset template to the device, the processor is further configured to execute the instructions to:

verify the licensee device information to acquire a first verification result; and send the preset template to the device in a case where the first verification result indicates that the verification is passed.

7. The unified playback control system according to claim 5, wherein the processor is further configured to execute the instructions to manage and control the playback of the device by means of the preset template in a following manner:

receive a first authentication request sent by the device by means of the preset template;

acquire an authentication result according to the first authentication request;

in a case where the authentication result indicates that the authentication is passed, splice a playback Uniform Resource Locator (URL), and send the spliced playback URL to the device; and in a case where the authentication result indicates that the authentication is failed, send at least one of an authentication failure result or product subscription information to the device.

8. The unified playback control system according to claim 7, wherein the first authentication request comprises provider information and content information; and the processor is further configured to execute the instructions to acquire the authentication result according to the first authentication request in a following manner:

verify the provider information and the content information to acquire a second verification result;

in a case where the second verification result indicates that the verification is failed, set the authentication result as indicating that the authentication is failed;

in a case where the second verification result indicates that the verification is successful, send a second authentication request to a management platform; and receive the authentication result sent by the management platform according to the second authentication request.

9. A computer device, comprising a processor, a memory, and a communication bus, wherein the communication bus is configured to conduct connection communication between the processor and the memory; and the processor is configured to perform one or more programs stored in the memory to implement operations of the control method of a unified playback control system according to claim 1.

10. A non-transitory computer-readable storage medium, storing one or more programs, wherein the one or more programs are executable by one or more processors, so as to implement operations of the control method of a unified playback control system according to claim 1.

11. The control method of a unified playback control system according to claim 1, wherein receiving the template request sent by the device comprises:

receiving, by a front-end device of a—the unified playback control system, the template request sent by the device and transmitting the template request to one of playback control servers of the unified playback control system by polling.

12. The control method of a unified playback control system according to claim 11, wherein before receiving the template request sent by the device, the method further comprises:

when the user logs in on the device, sending a login request to the EPG platform for verification, and after the EPG platform successfully verifies login of the user, redirecting the device to the unified playback control system.

13. The control method of a unified playback control system according to claim 11, wherein sending the preset template to the device comprises:

sending the preset template stored in the unified playback control system to the device.

14. The control method of a unified playback control system according to claim 2, wherein the licensee device information is a combination of a licensee identifier and a device identifier or information formed by encrypting the combination of the licensee identifier and the device identifier.

15. The control method of a unified playback control system according to claim 14, wherein in a case where the licensee device information is information formed by encrypting the combination of the licensee identifier and the device identifier, before verifying the licensee device information to acquire a first verification result, the method further comprises: decrypting the licensee device information.

16. A computer device, comprising a processor, a memory, and a communication bus, wherein the communication bus is configured to conduct connection communication between the processor and the memory; and the processor is configured to perform one or more programs stored in the memory to implement operations of the control method of a unified playback control system according to claim 2.

17. A computer device, comprising a processor, a memory, and a communication bus, wherein the communication bus is configured to conduct connection communication between the processor and the memory; and the processor is configured to perform one or more programs stored in the memory to implement operations of the control method of a unified playback control system according to claim 3.

18. A non-transitory computer-readable storage medium, storing one or more programs, wherein the one or more programs are executable by one or more processors, so as to implement operations of the control method of a unified playback control system according to claim 2.

19. A non-transitory computer-readable storage medium, storing one or more programs, wherein the one or more programs are executable by one or more processors, so as to implement operations of the control method of a unified playback control system according to claim 3.

20. A non-transitory computer-readable storage medium, storing one or more programs, wherein the one or more programs are executable by one or more processors, so as to implement operations of the control method of a unified playback control system according to claim 4.

* * * * *